United States Patent [19]

Togawa et al.

[11] 4,299,882

[45] Nov. 10, 1981

[54] MAGNETIC RECORDING MEDIUM AND PROCESS

[75] Inventors: Fumio Togawa, Otsu; Haruo Andoh; Toshihiko Tanabe, both of Suita, all of Japan

[73] Assignee: Hitachi Maxell, Ltd., Osaka, Japan

[21] Appl. No.: 154,015

[22] Filed: May 28, 1980

[30] Foreign Application Priority Data

May 28, 1979 [JP] Japan ................................. 54/65800
Jul. 7, 1979 [JP] Japan ................................. 54/86342

[51] Int. Cl.$^3$ ............................................. B32B 5/16
[52] U.S. Cl. ................................. 428/329; 252/62.54; 427/127; 427/128; 427/130; 428/330; 428/411; 428/469; 428/470; 428/694; 428/702; 428/900

[58] Field of Search ............................ 427/127–132, 427/48; 428/900, 329, 330, 411, 469, 470, 694, 702; 252/62.54

[56] References Cited

FOREIGN PATENT DOCUMENTS 54-11703 1/1979 Japan .

*Primary Examiner*—Bernard D. Pianalto
*Attorney, Agent, or Firm*—Birch, Stewart, Kolasch and Birch

[57] ABSTRACT

A magnetic recording medium which comprises a base and a magnetic layer of a magnetic coating composition comprising magnetic particles and a binder provided on said base, characterized in that the magnetic coating composition further comprises a dialkylsulfosuccinate.

7 Claims, No Drawings

MAGNETIC RECORDING MEDIUM AND PROCESS

BACKGROUND OF THE INVENTION

The present invention relates to a magnetic recording medium such as a magnetic recording tape. More particularly, it relates to a magnetic recording medium improved in dispersibility and orientability of the magnetic particles, enhanced in surface properties and durability of the magnetic layer and excellent in electro-acoustic properties such as output in a high frequency region and S/N ratio.

In general, a magnetic recording medium comprises a base and a magnetic layer provided on the surface of the base. The magnetic layer is usually formed by applying a magnetic coating composition comprising magnetic particles and a binder onto the surface of the base (e.g. a polyester film). Since the electro-acoustic properties of the magnetic recording medium greatly depend upon the dispersing state of the magnetic particles in the magnetic layer, the magnetic particles are required to be well dispersed in the magnetic layer. However, the magnetic particles are apt to be cohered between or among them, and therefore it is hard to achieve a uniform dispersion of the magnetic particles in the binder. Thus, a magnetic recording medium having satisfactory electro-acoustic properties has not been provided.

In order to prevent the cohesion between or among the magnetic particles and to improve the electro-acoustic properties of a magnetic recording medium, it has been proposed to incorporate dispersing agents such as lecithin, alkylamine salts, fatty acid soaps, resin acid soaps and quaternary ammonium salts into the magnetic layer. However, their dispersing effect on the magnetic particles is still unsatisfactory.

SUMMARY OF THE INVENTION

As the result of an extensive study, it has now been found that the incorporation of a dialkylsulfosuccinate into a magnetic coating composition comprising magnetic particles and a binder improves the dispersibility of the magnetic particles in the magnetic layer made of such composition. Due to the improvement of the dispersibility of the magnetic particles, the orientability of the magnetic particles and the surface properties of the magnetic layer are enhanced so that the electro-acoustic properties of the resulting magnetic recording medium are favorably increased. This invention is based on the above finding.

DETAILED DESCRIPTION OF THE INVENTION

According to the present invention, there is provided a magnetic recording medium which comprises a base and a magnetic layer of a magnetic coating composition comprising magnetic particles and a binder provided on the surface of said base, characterized in that the magnetic coating composition comprises further a dialkylsulfosuccinate. The magnetic recording medium is improved in dispersibility and orientability of the magnetic particles and enhanced in surface properties and durability of the magnetic layer so that the electro-acoustic properties are favorably increased.

As the base, there may be used films made of cellulose acetate, polyvinyl chloride, polyvinyl acetate, polyesters, etc., among which a polyester film is particularly favorable.

The magnetic coating composition may comprise magnetic particles and a binder with a dialkylsulfosuccinate. Examples of the magnetic particles are oxide particles such as $\gamma$-$Fe_2O_3$, Co-containing $\gamma$-$Fe_2O_3$, $Fe_3O_4$, Co-containing $Fe_3O_4$ and $CrO_2$, particles of metals (e.g. Fe, Co, Ni) and their alloys, etc. Among them, cobalt-containing magnetic iron oxide particles, which have become very frequently used in recent years, are particularly cohesive, and their uniform dispersion is hardly obtainable. This invention is quite effective in achieving a uniform dispersion even if such magnetic particles are used.

As the binder, there may be employed polyvinyl chloride, vinyl chloride/vinyl acetate copolymers, cellulose derivatives, butyral resins, urethane resins, epoxy resins, polyester resins, polyether resins, etc. Among them, the use of vinyl chloride/vinyl acetate copolymers comprising units of vinyl alcohol in a content of not less than 10% by weight, particularly from 10 to 20% by weight, is favorable. Such copolymers have usually a molecular weight of 15,000 to 20,000. Commercially available products of vinyl chloride/vinyl acetate copolymers are "ESLEC A-5" (containing units of vinyl alcohol in an amount of about 12% by weight; Sekisui Chemical Corp.), "DENKA VINYL No. LOH" (containing units of vinyl alcohol in an amount of about 10% by weight; Denki Kagaku Industries, Ltd.), "VAGH" (vinyl chloride:vinyl acetate:vinyl alcohol (91:3:6 by weight) copolymer; Union Carbide Corp.), "DENKA B-1" (vinyl chloride:vinyl acetate:acrylate:vinyl alcohol (80:5:5:10 by weight) copolymer; Denki Kagaku Industries, Ltd.), "VYHH" (vinyl chloride:vinyl acetate (86:14 by weight) copolymer; Union Carbide Corp.), "VMCH" (vinyl chloride:vinyl acetate:maleic acid (86:13:1 by weight) copolymer; Union Carbide Corp.), etc.

Thermoplastic polyurethanes are also usable as one of the preferred binders, because they are effective in improving abrasion resistance and softness of the magnetic layer. Since, however, their use in excessive amounts results in depression of the dispersibility of the magnetic particles, their combined use with said vinyl chloride/vinyl acetate copolymers in a weight proportion of 10:90 to 90:10 is recommended. Specific examples of the thermoplastic polyurethanes are "PARAPRENE 22S" and "PARAPRENE 26S" (Japan Polyurethane Co., Ltd.), "PANDEX T-5201", "PANDEX T-5205" and "PANDEX T-5102A" (Dai-Nippon Ink Chem. Ind. Ltd.), "ESTANE 5711", "ESTANE 5715" and "ESTANE 5703" (Goodrich Chemical Corp.), etc.

When said vinyl chloride/vinyl acetate copolymers and/or thermoplastic polyurethanes are employed, low molecular weight polyisocyanates may be used together. Such low molecular weight polyisocyanates are crosslinked with the hydroxyl group in the vinyl chloride/vinyl acetate copolymers or with the hydroxyl group and/or the isocyanate group in the thermoplastic polyurethanes so as to enhance the abrasion resistance, heat resistance, solvent resistance, etc. of the magnetic layer much more. Specific examples of the low molecular weight polyisocyanates include diisocyanates having a molecular weight of not more than 1,000 such as 2,4-tolylene diisocyanate, m-phenylene diisocyanate, 4,4-bisphenylene diisocyanate, 1,4-cyclohexylene diisocyanate, 1,5-tetrahydronaphthalene diisocyanate, 1,6-hexamethylene diisocyanate, 4-chloro-1,3-phenylene diisocyanate, 1,5-naphthalene diisocyanate, etc. Their commercially available products are "Colonate L", "Desmodur L", etc. The amount of the low molecular weight polyisocyanates may be 3 to 50% by weight based on the total weight of the binder.

The weight proportion of the magnetic particles and the binder may be usually from 15:85 to 30:70.

The dialkylsulfosuccinate to be incorporated into the magnetic coating composition according to this invention is representable by the formula:

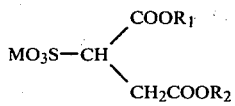

$$MO_3S-CH\begin{matrix}COOR_1\\CH_2COOR_2\end{matrix}$$

wherein $R_1$ and $R_2$ are each an alkyl group, preferably having 3 to 18 carbons, and M is a monovalent metal, particularly an alkali metal (e.g. sodium, potassium). Commercially available sodium di($C_3$–$C_{18}$)sulfosuccinates under the tradenames "BURENOHRU B-18" (Yoshimura Oil Chemical Co., Ltd.), "RAPIZOHRU B-30" (Nippon Oil & Fats Co., Ltd.), "SAMMORIN OT-70" (Sanyo Chemical Industries Ltd.), "AEROLE CT-1" (Toho Chemical Industry Co., Ltd.), etc. may be employed. The amount of the dialkylsulfosuccinate to be incorporated is preferred to be from 0.1 to 10% by weight based on the weight of the magnetic particles. When it is smaller than the lower limit, the dispersibility is not materially improved. When it is larger than the upper limit, the excess is exuded out on the surface of the magnetic layer to cause various troubles such as magnetic head clogging and depression of the output in a high frequency region on the reproduction.

If desired, any conventional dispersing agent may be optionally incorporated into the magnetic coating composition. Particularly, lecithin is effective in enhancement of the sensitivity (output) in a high frequency region when used in combination with the dialkylsulfosuccinate.

For preparation of the magnetic coating composition, the magnetic particles, the binder and the dialkylsulfosuccinate, when used, with any other additive are mixed together in a suitable solvent. Examples of the solvent are ketones (e.g. cyclohexanone, methylisobutylketone, methylethylketone), esters, (e.g. ethyl acetate), hydrocarbons (e.g. toluene), alcohols (e.g. isopropanol), acid amides (e.g. dimethylformamide), sulfoxides (e.g. dimethylsulfoxide), ethers (e.g. tetrahydrofuran, dioxane), etc. The mixation may be effected by the use of any conventional apparatus such as a kneader, a roll, a colloid mill or a planetary mixer.

Particularly preferred is to coat the surfaces of the magnetic particles with the dialkylsulfosuccinate and admix such coated magnetic particles with other components for the magnetic coating composition such as the binder in a suitable solvent, because this procedure is particularly effective for prevention of the cohesion between or among the magnetic particles. Thus, the magnetic particles are originally water-philic, and the binding force between or among them in an aqueous medium is relatively weak so that a good dispersion is readily obtainable; in the state of such good dispersion, the surfaces of the magnetic particles are coated with the dialkylsulfosuccinate so that the cohesion between or among the magnetic particles is presented even on the drying. Since the surfaces of the magnetic particles are coated as above, the magnetic coating composition can be well mixed uniformly. Application of a shearing force to the coated magnetic particles will enhance the dispersing effect.

For instance, a cobalt salt (e.g. cobalt chloride, cobalt sulfate, cobalt nitrate) or its mixture with any other metal salt such as a ferrous salt (e.g. ferrous chloride, ferrous sulfate) is reacted with an alkali (e.g. sodium hydroxide) in an aqueous suspension containing magnetic iron oxide particles (e.g. $\gamma$-$Fe_2O_3$, $Fe_3O_4$, partially reduced product of $\gamma$-$Fe_2O_3$) at a temperature of 20° to 100° C. to deposit the produced cobalt compound on the surface of the magnetic iron oxide particles. The thus obtained cobalt-containing magnetic iron oxide particles are then treated with the dialkylsulfosuccinate in an aqueous solution so as to deposit the dialkylsulfosuccinate on the surfaces of the cobalt-containing magnetic iron oxide particles. Preferably, the resultant coated cobalt-containing magnetic iron oxide particles is subjected to application of shearing force in the form of water-containing cake (e.g. water content, about 40 to 20% by weight). The application of shearing force may be effected by the use of a conventional mixing machine such as a kneader, a roll, a colloid mill, a continuous kneader or a planetary mixer.

The magnetic recording medium of the invention may be prepared by a per se conventional procedure. For instance, the magnetic coating composition as obtained above may be applied on the surface of a base such as a polyester film, followed by drying to make a magnetic layer of a desired thickness.

As stated above, the magnetic recording medium thus obtained is improved in the dispersibility of the magnetic particles in the magnetic layer. As a result, the squareness (Br/Bs) and the orientation ratio (O.R.) are much increased. Thus, the magnetic recording medium of the invention is improved in the orientability of the magnetic field and has good surface gloss as well as high surface smoothness. It is particularly notable that the magnetic recording medium is highly enhanced in the electro-acoustic property in a high frequency region.

PREFERRED EMBODIMENTS

Practical and presently preferred embodiments of this invention are illustratively shown in the following Examples wherein part(s) and % are by weight, unless otherwise indicated.

EXAMPLE 1

Cobalt-containing magnetic iron oxide particles (800 g), sodium dioctylsulfosuccinate (16 g), VAGH (hydroxyl group-containing vinyl chloride-vinyl acetate copolymer; manufactured by Union Carbide Corp. (U.S.A.)) (120 g) and a mixture of methylisobutylketone and toluene (1:1) (820 g) were mixed together in a 3 liter volume ball mill for 72 hours, and an urethane prepolymer (80 g) and a mixture of methylisobutylketone and toluene (1:1) (200 g) were added thereto. The resultant mixture was stirred for 30 minutes to give a magnetic coating composition.

The magnetic coating composition was applied onto a polyester film of 11.7 μm thick and dried to make a magnetic layer of about 6 μm thick. After calendering the surface of the magnetic layer, the polyester film was cut in a designed width (1/7 inch for cassette) to make a magnetic recording tape.

EXAMPLE 2

In the same manner as in Example 1 but using metallic iron particles (800 g) in place of cobalt-containing magnetic iron oxide, a magnetic coating composition was prepared. Using the magnetic coating composition, there was prepared a magnetic recording tape.

EXAMPLE 3

In the same manner as in Example 1 but using $\gamma$-$Fe_2O_3$ magnetic particles (800 g) in place of cobalt-containing magnetic iron oxide, a magnetic coating composition was prepared. Using the magnetic coating composition, there was prepared a magnetic recording tape.

EXAMPLE 4

In the same manner as in Example 1 but using sodium dioctylsulfosuccinate (0.6 g) in place of its 16 g, a magnetic coating composition was prepared. Using the magnetic coating composition, there was prepared a magnetic recording tape.

EXAMPLE 5

In the same manner as in Example 1 but using sodium dioctylsulfosuccinate (100 g) in place of its 16 g, a magnetic coating composition was prepared. Using the magnetic coating composition, there was prepared a magnetic recording tape.

EXAMPLE 6

Cobalt-containing magnetic iron oxide particles (800 g), sodium dioctylsulfosuccinate (16 g), water (4000 ml) and ethanol (40 ml) were mixed together in a mixer for 30 minutes and filtered. The collected particles (816 g) after drying were charged in a 3 liter volume ball mill and mixed with "VAGH" (120 g) and a mixture of methylisobutylketone and toluene (1:1) (820 g) for 30 minutes to give a magnetic coating composition. Using the magnetic coating composition, there was prepared a magnetic recording tape as in Example 1.

EXAMPLE 7

To a mixture of needle $\gamma$-$Fe_2O_3$ magnetic particles (1200 g), cobalt sulfate ($CoSO_4.7H_2O$) (160 g), ferrous sulfate ($FeSO_4.7H_2O$) (396 g) and sodium hydroxide (480 g), there was added water to make a volume of 8 liters. The resulting suspension was heated at 100° C. for 6 hours and filtered. The collected particles were washed with water until the washing showed pH 8.0 or less. The resulting water-containing cake (water content, about 35%) was admixed with sodium dioctylsulfosuccinate (24 g), stirred for 1 hour and heated at 130° C. for 3 hours to dry. The resultant cobalt-containing magnetic iron oxide particles (816 g) were charged in a 3 liter volume ball mill and mixed with "VAGH" (120 g) and a mixture of methylisobutylketone and toluene (1:1) (820 g) for 30 minutes to give a magnetic coating composition. Using the magnetic coating composition, there was prepared a magnetic recording tape as in Example 1.

EXAMPLE 8

In the same manner as in Example 7 but kneading at 60 rpm for 1 hour by a kneader in place of stirring for 1 hour, a magnetic coating composition was prepared. Using the magnetic coating composition, there was prepared a magnetic recording tape.

EXAMPLE 9

In the same manner as in Example 8 but using needle magnetic iron oxide particles ($Fe^{++}/Fe^{+++}=0.20$) (1200 g) in place of needle $\gamma$-$Fe_2O_3$ magnetic particles, a magnetic coating composition was prepared. Using the magnetic coating composition, there was prepared a magnetic recording tape.

EXAMPLE 10

In the same manner as in Example 7 but using lecithin (12 g) and sodium dioctylsulfosuccinate (12 g) in place of sodium dioctylsulfosuccinate (24 g), a magnetic coating composition was prepared. Using the magnetic coating composition, there was prepared a magnetic recording tape.

COMPARATIVE EXAMPLE 1

In the same manner as in Example 1 but excluding sodium dioctylsulfosuccinate, a magnetic coating composition was prepared. Using the magnetic coating composition, there was prepared a magnetic recording tape.

COMPARATIVE EXAMPLE 2

In the same manner as in Example 3 but excluding sodium dioctylsulfosuccinate, a magnetic coating composition was prepared. Using the magnetic coating composition, there was prepared a magnetic recording tape.

COMPARATIVE EXAMPLE 3

In the same manner as in Example 1 but using an octadecylamine acetate (16 g) in place of sodium dioctylsulfosuccinate (16 g), a magnetic coating composition was prepared. Using the magnetic coating composition, there was prepared a magnetic recording tape.

COMPARATIVE EXAMPLE 4

In the same manner as in Example 1 but using lecithin (16 g) in place of sodium dioctylsulfosuccinate (16 g), a magnetic coating composition was prepared. Using the magnetic coating composition, there was prepared a magnetic recording tape.

COMPARATIVE EXAMPLE 5

In the same manner as in Example 8 but using an octadecylamine acetate (24 g) in place of sodium dioctylsulfosuccinate (24 g), a magnetic coating composition was prepared. Using the magnetic coating composition, there was prepared a magnetic recording tape.

With each of the magnetic recording tapes obtained in Examples 1 to 10 and Comparative Examples 1 to 5, the coercive force (Hc), the residual flux density (Br), the saturated flux density (Bs), the squareness (Br/Bs), the orientation ratio (O.R.) and the surface gloss were measured. The electro-acoustic properties such as sensitivity (333 Hz), frequency response at high region (7 KHz, 10 KH1, 12.5 KHz), maximum output level (333 Hz) and S/N ratio (AC) were also measured.

The results are shown in Table 1 wherein the surface gloss was determined by the use of a gonio-photometer and indicated by the relative value when the value with Comparative Example 1 is taken as 100. Further, the conditions for measurement of the electro-acoustic properties are shown below.

Deck: cassette tape measuring apparatus DENON-DN 322RT;

Tape speed: 4.76 cm/sec;
Truck width: 1.5 mm;
Bias: chromium position regulated bias current;
Reproducing icorizer: $T_1=3188$ μs, $T_2=70$ μs;
Recording head: sendust head, gap length 3 μm;
Reproducing head: sendust head, gap length/μm;
Residual flux of O, $d_B$:250 PWb/mm;
Bias wave number: 200 KHz.

TABLE 1

| Item | | Example 1 | 2 | 3 | 4 | 5 | 6 | 7 | 8 | 9 | 10 | Comparative Example 1 | 2 | 3 | 4 | 5 |
|---|---|---|---|---|---|---|---|---|---|---|---|---|---|---|---|---|
| Hc (Oersted) | | 600 | 1110 | 348 | 602 | 601 | 601 | 595 | 590 | 650 | 585 | 602 | 350 | 598 | 600 | 347 |
| Br (Gauss) | | 1590 | 3000 | 1550 | 1530 | 1490 | 1622 | 1640 | 1680 | 1750 | 1750 | 1529 | 1450 | 1580 | 1585 | 1510 |
| Bs (Gauss) | | 1880 | 3850 | 1850 | 1854 | 1820 | 1920 | 1930 | 1950 | 2050 | 2030 | 1851 | 1820 | 1910 | 1910 | 1890 |
| (Br/Bs)∥ | | 0.846 | 0.78 | 0.838 | 0.825 | 0.819 | 0.845 | 0.850 | 0.862 | 0.854 | 0.862 | 0.826 | 0.796 | 0.827 | 0.830 | 0.799 |
| O.R. (Br/Bs)∥/(Br/Bs)⊥ | | 2.63 | 1.90 | 2.45 | 2.41 | 2.35 | 2.65 | 2.69 | 2.71 | 2.75 | 2.75 | 2.40 | 2.15 | 2.46 | 2.40 | 2.21 |
| Surface gloss | | 140 | 125 | 145 | 100 | 85 | 135 | 140 | 145 | 152 | 154 | 100 | 120 | 103 | 105 | 128 |
| Thickness of magnetic layer after drying (μm) | | 6.0 | 4.0 | 6.0 | 6.0 | 6.0 | 6.1 | 6.0 | 6.0 | 6.0 | 6.0 | 6.0 | 6.0 | 6.0 | 6.2 | 6.0 |
| Electro-acoustic property (dB) | Sensitivity 333 Hz (dB) | +2.5 | +2.0 | +2.2 | +2.3 | +2.1 | +2.5 | +2.6 | +2.8 | +2.5 | +3.0 | +2.3 | +2.1 | +2.5 | +2.4 | +2.3 |
| | Frequency at 7 KHz | +0.7 | +1.5 | +4.0 | 0 | −0.5 | +0.7 | +0.9 | +0.9 | +1.5 | +1.1 | 0 | +3.8 | 0 | 0 | +3.9 |
| | response at 10 KHz | +0.8 | +2.3 | +5.2 | +0.2 | −0.8 | +0.9 | +1.1 | +1.2 | +2.0 | +1.4 | +0.2 | +5.0 | +0.2 | +0.2 | +5.2 |
| | at 12.5 KHz | +0.8 | +3.0 | +6.1 | +0.2 | 0 | +0.9 | +1.3 | +1.5 | +2.5 | +1.8 | +0.2 | +5.6 | +0.5 | +0.2 | +5.9 |
| MOL 333 Hz (dB) | | +5.0 | +5.0 | +5.8 | +4.6 | +4.2 | +5.1 | +5.4 | +5.8 | +5.3 | +6.1 | +4.6 | +5.4 | +5.0 | +4.7 | +5.8 |
| S/N ratio (dB) | | 63.0 | 61.5 | 56.2 | 63.0 | 63.0 | 63.2 | 63.2 | 63.2 | 63.5 | 63.2 | 63.0 | 56.2 | 63.0 | 63.0 | 56.0 |

From the above Table, it is understood that in comparison with the magnetic recording tapes wherein the magnetic layer is made of a magnetic composition comprising no dispersing agent (cf. Comparative Examples 1 and 2) and wherein the magnetic layer is made of a magnetic composition comprising a dispersing agent other than a dialkylsulfosuccinate (cf. Comparative Examples 3 to 5), the magnetic recording tapes (cf. Examples 1 to 10) wherein the magnetic layer is made of a magnetic composition comprising a dialkylsulfosuccinate as a dispersing agent are more excellent in squareness, residual flux density and orientability, better in surface glosses and improved in dispersibility with enhanced performances. It is also understood that the amount of the dialkylsulfosuccinate to be incorporated into the magnetic coating composition is preferred to be from 0.1 to 10% by weight (cf. Examples 1, 4 and 5). It is further understood that the incorporation of the dialkylsulfosuccinate by coating on cobalt-containing magnetic iron oxide particles (cf. Examples 8 and 9) is prefered to that of the dialkylsulfosuccinate by simple mixation into magnetic iron oxide particles. Particularly when the dialkylsulfosuccinate is coated on the surfaces of cobalt-containing magnetic iron oxide particles and lecithin is co-used as a dispersing agent, the resulting magnetic recording tape shows an excellent sensitivity (output) at a high frequency region (cf. Example 10).

What is claimed is:

1. A magnetic recording medium which comprises a base and a magnetic layer of a magnetic coating composition comprising magnetic particles and a binder provided on said base, said magnetic coating composition further comprising a dialkylsulfosuccinate which is present in the magnetic coating composition in an amount of 0.1 to 10% by weight, based on the weight of the magnetic particles in the magnetic coating composition.

2. The magnetic recording medium according to claim 1, wherein the dialkylsulfosuccinate is represented by the formula:

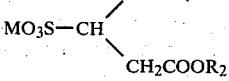

wherein M is a metal atom and $R_1$ and $R_2$ are each an alkyl group having 3 to 18 carbon atoms.

3. The magnetic recording medium according to claim 2, wherein the dialkylsulfosuccinate is sodium dialkylsulfosuccinate.

4. The magnetic recording medium according to claim 3, wherein the dialkylsulfosuccinate is sodium dioctylsulfosuccinate.

5. The magnetic recording medium according to claim 1, wherein the magnetic particles are coated with the dialkylsulfosuccinate.

6. The magnetic recording medium according to claim 1, wherein the magnetic particles are cobalt-containing magnetic iron oxide particles.

7. A process for preparing a magnetic recording medium which comprises the steps of (1) reacting a cobalt salt with an alkali in an aqueous suspension containing magnetic iron oxide particles so as to deposit the produced cobalt compound on the surfaces of the magnetic iron oxide particles, (2) drying the cobalt-containing magnetic iron oxide particles, (3) admixing the dried cobalt-containing magnetic iron oxide particles with a binder in a suitable solvent to make a magnetic coating composition and (4) applying the magnetic coating composition on the surface of a base, said cobalt-containing magnetic iron oxide particles obtained in the step (1) being further coated with a dialkylsulfosuccinate at the surfaces prior to drying in step (2) said dialkylsulfosuccinate being present in the magnetic coating composition in an amount of 0.1 to 10% by weight, based on the weight of the magnetic particles in the magnetic coating composition.

* * * * *